(12) United States Patent
Zhao et al.

(10) Patent No.: US 7,956,146 B2
(45) Date of Patent: Jun. 7, 2011

(54) TIRE WITH TREAD OF POLYBUTADIENE RUBBER

(75) Inventors: Junling Zhao, Hudson, OH (US); Aaron Scott Puhala, Kent, OH (US); Steven Wayne Cronin, Akron, OH (US); Paul Harry Sandstrom, Cuyahoga Falls, OH (US); John Joseph Andre Verthe, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 332 days.

(21) Appl. No.: 12/391,480

(22) Filed: Feb. 24, 2009

(65) Prior Publication Data

US 2010/0216939 A1    Aug. 26, 2010

(51) Int. Cl.
*C08F 136/06* (2006.01)
*C08L 9/00* (2006.01)
*B60C 1/00* (2006.01)

(52) U.S. Cl. .................. 526/340.4; 152/209.1; 152/450; 152/525; 152/905

(58) Field of Classification Search ................ 526/340.4; 152/209.1, 450, 525, 905
See application file for complete search history.

(56) References Cited

U.S. PATENT DOCUMENTS

| | | | | |
|---|---|---|---|---|
| 5,451,646 | A | 9/1995 | Castner | 526/137 |
| 6,812,277 | B2 * | 11/2004 | Zanzig et al. | 524/496 |
| 6,959,744 | B2 | 11/2005 | Sandstrom et al. | 152/209.5 |
| 7,367,369 | B2 * | 5/2008 | Sandstrom et al. | 152/209.1 |
| 7,511,108 | B2 * | 3/2009 | Suzuki et al. | 526/340.4 |
| 7,851,537 | B2 * | 12/2010 | Anbe et al. | 524/493 |

FOREIGN PATENT DOCUMENTS

| | | |
|---|---|---|
| EP | 1221385 | 7/2002 |
| EP | 1398347 | 9/2003 |
| EP | 1637549 | 3/2006 |
| EP | 1640182 | 3/2006 |
| EP | 1818188 | 8/2007 |

OTHER PUBLICATIONS

European Search Report completed Jun. 7, 2010.

* cited by examiner

*Primary Examiner* — Satya B Sastri
(74) *Attorney, Agent, or Firm* — Henry C. Young, Jr.

(57) ABSTRACT

Pneumatic rubber tire with an outer, circumferential tread comprised of specialized cis 1,4-polybutadiene rubber based silica/carbon black reinforced rubber composition.

7 Claims, No Drawings

TIRE WITH TREAD OF POLYBUTADIENE RUBBER

FIELD OF THE INVENTION

Pneumatic rubber tire with a circumferential tread of cis 1,4-polybutadiene rubber.

BACKGROUND OF THE INVENTION

Polybutadiene rubber is generally not considered as being suitable as a base elastomer for tire treads without an inclusion of a significant amount of an additional elastomer to achieve desirable physical properties for the cured rubber tread and to achieve suitable processing for the uncured rubber composition, particularly for heavy duty pneumatic rubber tires having a tread of a natural rubber-rich composition.

While such natural rubber-rich rubber treads often contain a small amount of synthetic cis 1,4-polybutadiene rubber to promote resistance to treadwear during use of the tire in heavy duty service, total replacement of the natural rubber with synthetic cis 1,4-polybutadiene rubber would be a significant departure from past practice.

A challenge is therefore presented for evaluating whether a synthetic rubber, namely synthetic cis 1,4-polybutadiene rubber, may be used to totally replace natural rubber for such heavy duty tire treads and thereby achieve a significant improvement in wear resistance with similar tear resistance for the tire tread rubber composition and with suitable processability of the uncured rubber. A specialized synthetic cis 1,4-polybutadiene rubber having a broad heterogeneity index is evaluated for such purpose.

Such cis 1,4-polybutadiene rubber is considered herein to be specialized and thereby differing from more conventional cis 1,4-polybutadiene elastomers in a sense of having a broad heterogeneity index, namely a significant difference between its number average molecular weight (Mn) and weight average molecular weight (Mw) in which the number average molecular weight (Mn) is relatively low for a cis 1,4-polybutadiene rubber. Such combination of wide heterogeneity index and relatively low Mn for the specialized cis 1,4-polybutadiene elastomer is believed to be indicative of a branched configuration for the elastomer, namely that the polymer structure has a degree of branching which, in turn, is believed to be responsible for better processability of the specialized cis 1,4-polybutadiene to thereby also enable the total replacement of the natural rubber for the tire tread on an uncured rubber processability basis.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

Disclosure and Practice of the Invention

In accordance with this invention, a pneumatic rubber tire is provided having a circumferential rubber tread where said tread is a rubber composition exclusive of cis 1,4-polyisoprene rubber (particularly natural rubber) and comprised of, based on parts by weight per 100 parts by weight of the tread rubber (phr), (A) 100 phr of cis 1,4-polybutadiene rubber comprised of:
  (1) specialized cis 1,4-polybutadiene rubber, having a microstructure comprised of about 96 to about 99 percent cis 1,4-isomeric units, a number average molecular weight (Mn) in a range of from about 90,000 to about 130,000 (a relatively low Mn for a cis 1,4-polybutadiene elastomer) and a heterogeneity index (Mw/Mn) in a range of from about 2.5/1 to about 5/1 (a relatively high heterogeneity index range illustrating a significant disparity between its number average and weight average molecular weights),
  wherein said specialized cis 1,4-polybutadiene rubber is the product of polymerization (homo-polymerization) of 1,3-butadiene monomer in an organic solvent in the presence of a catalyst composed of nickel octoate, tri-isobutylaluminum, hydrogen fluoride and parastyrenated diphenylamine, or
  (2) said specialized cis 1,4-polybutadiene rubber and up to 50 phr (alternately from 10 to 45 phr) of designated cis 1,4-polybutadiene rubber having a microstructure comprised of about 96 to about 99 percent cis 1,4-isomeric units, a number average molecular weight (Mn) in a range of from about 150,000 to about 200,000 and a heterogeneity index (Mw/Mn) in a range of from about 1.5/1 to about 2/1 (a significantly narrower heterogeneity index range) illustrating a similarity between its weight average and number average molecular weights,
  wherein said designated cis 1,4-polybutadiene rubber is the product of polymerization (homo-polymerizing) 1,3-butadiene monomer in an organic solvent in the presence of a neodymium catalyst (neodymium based catalyst instead of catalyst containing any of cobalt, titanium or lithium);

(B) about 40 to about 110, alternatively about 50 to about 80, phr of reinforcing filler wherein said reinforcing filler is a combination of rubber reinforcing carbon black and synthetic amorphous silica (precipitated silica) comprised of:
  (1) about 20 to about 60, alternatively about 20 to about 50, phr of rubber reinforcing carbon black, and
  (2) about 10 to about 80, alternatively about 20 to about 50, phr of precipitated silica; and (C) coupling agent (for said precipitated silica) having a moiety reactive with hydroxyl groups (e.g. silanol groups) on said precipitated silica and another different moiety interactive with carbon-to-carbon double bonds of said cis 1,4-polybutadiene rubber.

In one embodiment of this invention, said cis 1,4-polybutadiene rubber is 100 phr of said specialized cis 1,4-polybutadiene rubber.

In another embodiment of the invention, the cis 1,4-polybutadiene rubber is a combination of said specialized cis 1,4-polybutadiene rubber and up to about 50 phr, (e.g. from 10 to 45 phr) of said designated cis 1,4-polybutadiene rubber.

A significant aspect of this invention is providing said tire tread of a rubber composition having its rubber component limited to said specialized cis 1,4-polybutadiene rubber, or alternatively, a combination of said specialized cis 1,4-polybutadiene and up to 50 phr (alternately up to 45 phr) of said designated cis 1,4-polybutadiene rubber, as the total replacement of (e.g. exclusive of) the cis 1,4-polyisoprene rubber.

This is considered herein to be significant in a sense that such practice is a significant departure from past practice for a heavy duty tire tread of which its elastomer would otherwise be primarily composed of natural cis 1,4-polyisoprene rubber.

In one embodiment of the invention, for the reinforcing filler, said rubber reinforcing carbon black is a relatively small particle sized, high structure, rubber reinforcing carbon black having an Iodine adsorption value (ASTM D1510) in a range of about 110 to about 145 g/kg, which is indicative of a relatively small sized carbon black together with a dibutylphthalate (DBP) value (ASTM D2414) in a range of about 110 to about 140, cc/100 g, which is indicative of a high structure carbon black. Representative of such small sized, high structure, rubber reinforcing carbon blacks are, for example, ASTM designated rubber reinforcing carbon blacks as exemplary N121 and N205 carbon blacks. Examples of various rubber reinforcing carbon blacks together with their Iodine number values and DBP values, may be found in *The Vanderbilt Rubber Handbook*, (1990), 13th edition, Pages 416 through 419.

Use of the small sized, high structure, rubber reinforcing carbon black(s), with such Iodine adsorption value range and DBP value range, is considered herein to be important in order to promote good abrasion resistance, or coefficient of friction, and higher stiffness for the tire tread to promote cornering and handling of the tire, and also enhanced, or relatively high hysteresis and better tear resistance which are desirable properties for the tread rubber composition of this invention.

In practice, said coupling agent may be comprised of a bis(3-trialkoxysilylalkyl) polysulfide having an average of from 2 to 4, alternately an average of from about 2 to about 2.6 or an average of from about 3.4 to about 3.8, connecting sulfur atoms in its polysulfidic bridge or comprised of an alkoxyorganomercaptosilane. Such coupling agents are well known to those having skill in such art.

Representative of said specialized cis 1,4-polybutadiene rubber for use in this invention is, for example, Budene1280™ from The Goodyear Tire & Rubber Company.

The specialized cis 1,4-polybutadiene rubber may be prepared, for example, by organic solvent solution polymerization of 1,3-butadiene monomer in the presence of a catalyst comprised of an organonickel compound, an organoaluminum compound, a fluorine-containing compound and a parastyrenated diphenylamine which method is exemplified in U.S. Pat. No. 5,451,646. Such catalyst components, as indicated in said U.S. patent, may be composed of nickel octoate, triisobutylaluminum, hydrogen fluoride and parastyrenated diphenylamine. It is considered herein that said specialized cis 1,4-polybutadiene may suitably be prepared by such polymerization without undue experimentation. While the technical aspect may not be fully understood, it is a feature of this invention that the specialized cis 1,4-polybutadiene rubber is differentiated from other cis 1,4-polybutadiene rubbers as being required to be the product of organic solvent solution polymerization of 1,3-butadiene monomer in the presence of the nickel octoate, triisobutylaluminum, hydrogen fluoride and parastyrenated diphenyl amine based catalyst.

The relatively broad heterogeneity index (Mw/Mn ratio range of from 2.5/1 to 5/1) of the specialized cis 1,4-polybutadiene elastomer is considered herein to be significant to promote improved processing of the unvulcanized specialized cis 1,4-polybutadiene rubber based rubber composition as compared to the designated cis 1,4-polybutadiene elastomer having a higher number average molecular weight (Mn) and narrower and lower heterogeneity index of, for example, from about 1.5/1 to about 2/1. The specialized cis 1,4-polybutadiene elastomer is also considered unique in that it is considered to have a degree of branched configuration which is considered herein to aid in its enhanced unvulcanized processability.

In the practice of this invention, use of specialized cis 1,4-polybutadiene rubber in a silica reinforcement-containing rubber composition, together with a coupling agent for the silica is considered herein to be important in order to optimize resistance to the rubber composition's abrasion (resistance to tread wear) and to promote a suitable hysteresis (e.g. rolling resistance) as well as suitable tear strength.

Representative of the designated cis 1,4-polybutadiene elastomer as cis 1,3-butadiene monomer catalyzed with a neodymium based catalyst (instead of catalyst based on cobalt, titanium or lithium compounds), is, for example, CB25™ from Lanxess Company.

Other neodymium catalysis prepared cis 1,4-polybutadiene rubbers (designated cis 1,4-polybutadiene rubbers) might be, for example, CB10™, CB22™, CB24™ and CB29™ from Lanxess Company.

The designated cis 1,4-polybutadiene rubber may be prepared, for example, by organic solvent solution polymerization of 1,3-butadiene monomer in the presence of a neodymium based catalyst (without catalyst cobalt, titanium or lithium compounds). It is considered herein that said designated cis 1,4-polybutadiene may suitably be prepared by such polymerization without undue experimentation. While the technical aspect may not be fully understood, it is a feature of this invention that the designated cis 1,4-polybutadiene rubber is differentiated from other cis 1,4-polybutadiene rubbers as being required to be the product of organic solvent solution polymerization of 1,3-butadiene monomer in the presence of a neodymium catalyst (not the nickel octoate, triisobutylaluminum, hydrogen fluoride and parastyrenated diphenyl amine based catalyst required for the specialized cis 1,4-polybutadiene rubber).

The significantly narrower heterogeneity index (Mw/Mn ratio range of from about 1.5/1 to 2/1) of the designated cis 1,4-polybutadiene elastomer, its higher number average molecular weight (Mn) of about 150,000 to about 200,000 as well as its required neodymium catalyst based derivation is considered herein to be significant in a sense of differentiating it from said specialized cis 1,4-polybutadiene rubber with its significantly broad heterogeneity index and significantly lower number average molecular weight (Mn) and required nickel-amine based catalyst derivation.

The precipitated silica for the reinforcing filler is a synthetic amorphous silica such as, for example, those obtained by the acidification of a soluble silicate (e.g., sodium silicate or a co-precipitation of a silicate and an aluminate). Such precipitated silicas are, in general, well known to those having skill in such art The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available synthetic silicas, particularly precipitated silicas, may be considered for use in this invention such as, for example, only and without limitation, silicas commercially available from PPG Industries under the Hi-Sil trademark with designations 210, 243, etc; silicas available from Rhodia, with designations of Zeosil 1165 MP and Zeosil 165GR and silicas available from Degussa AG with designations VN2 and VN3, 3770GR, and from Huber as Zeopol 8745.

The silica reinforcement for the rubber tire tread is used with a coupling agent.

The coupling agents cause the silica to have a reinforcing effect on the rubber, many of which are generally known to those skilled in such art. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of an alkoxy silane which has a constituent component, or moiety, (the alkoxy portion) capable of reacting with the silica surface (e.g. silanol groups on the silica surface) and, also, a constituent component, or moiety, capable of reacting with the rubber, particularly a sulfur vulcanizable rubber which contains carbon-to-carbon double bonds, or unsaturation. In this manner, then the coupling agent acts as a connecting bridge between the silica and the rubber and thereby enhances the rubber reinforcement aspect of the silica in a manner known to those having skill in such art.

Numerous coupling agents are taught for use in combining silica and rubber such as, for example, silane coupling agents containing a polysulfide component, or structure, such as bis-(3-alkoxysilylalkl) polysulfide which contains an average from 2 to about 4 (such as for example a range of from 2 to about 2.4 or a range of from 3 to about 4) connecting sulfur atoms in its polysulfidic bridge such as, for example, a bis-(3-triethoxysilylpropyl) polysulfide.

A usually desirable coupling agent is comprised of a bis-(3-ethoxysilylpropyl) polysulfide having from 2 to 4, with an average of from about 2 to 2.6, or an average of from about 3.4 to about 3.8, connecting sulfur atoms in the polysulfide bridge. Such coupling agent having an average of from about 2 to 2.6 connecting sulfur atoms in its polysulfidic bridge may be particularly desired in order to promote ease of processing, particularly mixing, the unvulcanized rubber composition.

For this invention, it is desired that the sulfur cured rubber composition for the tire tread containing the cis 1,4-polybutadiene rubber(s) without the natural rubber has physical properties presented in the following Table A in order to be a suitable replacement of natural rubber for a natural rubber rich heavy duty tire tread.

TABLE A

| | |
|---|---|
| Tear resistance, 95° C., of the cured rubber, (Newtons) of: | at least 150 |
| Dynamic storage modulus G', 100° C., of the uncured rubber (KPa) of: | less than 260 |
| Grosch abrasion rate (high severity), mg/km of the cured rubber of: | less than 200 |
| Heterogeneity index of the specialized cis 1,4-polybutadiene rubber as: | in a range of 2.5/1 to about 5/1 |

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, fatty acid comprised of, for example, stearic, oleic, palmitic, and possibly linolenic, acids, zinc oxide, sulfur-contributing material(s) and vulcanization accelerator(s) as hereinbefore mentioned.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following example in which the parts and percentages are by weight unless otherwise indicated.

EXAMPLE I

Rubber compositions were prepared to evaluate replacement of natural rubber with the specialized cis 1,4-polybutadiene rubber in a tire tread.

Such rubber compositions are referred in this Example as rubber Samples A and B.

Rubber Sample A is a Comparative natural rubber based rubber Sample.

Experimental rubber Sample B was a specialized cis 1,4-polybutadiene rubber based Sample.

The basic rubber composition formulation is shown in Table 1 and the ingredients are expressed in parts by weight per 100 parts rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

TABLE 1

| | Parts (phr) |
|---|---|
| First Non-Productive Mixing Step (NP1) - Mixed to 160° C. | |
| Natural cis 1,4-polyisoprene rubber (SMR20) | 0 or 100 |
| Specialized cis 1,4-polybutadiene rubber[1] | 0 or 100 |
| Carbon black, rubber reinforcing (N121)[2] | 5 |
| Silica, precipitated[3] | 2 |
| Silica coupling agent[4] | 2.6 |

TABLE 1-continued

| | Parts (phr) |
|---|---|
| Wax microcrystalline and paraffin | 1.5 |
| Fatty acid[5] | 2 |
| Antioxidants | 2.8 |
| Zinc oxide | 3 |
| Productive Mixing Step (PR) - Mixed to 110° C. | |
| Sulfur | 1.4 |
| Accelerator(s)[6] | 2 |

[1]Specialized cis 1,4-polybutadiene rubber (said nickel-amine catalyzed 1,3-butadiene monomer) as Budene1280 ™ from The Goodyear Tire & Rubber Company having a Tg of about −105° C. and heterogeneity index in a range of from about 2.5/1 to about 3/1.

[2]Rubber reinforcing carbon black as N121, an ASTM designation

[3]Precipitated silica as Zeosil ™ Z1165 MP from the Rhodia Company

[4]Coupling agent comprised of bis(3-triethoxysilylpropyl) polysulfide having an average of from about 2 to about 2.6 connecting sulfur atoms as Si266 ™ from Evonik Degussa

[5]Mixture comprised of stearic, palmitic and oleic acids

[6]Sulfenamide and diphenyl guanidine sulfur cure accelerators

The following Table 2 represents the uncured and cure behavior and various physical properties of the rubber compositions based upon the basic formulation of Table 1, and reported as rubber Samples A and B.

TABLE 2

| | Control A | Experimental B |
|---|---|---|
| Natural rubber - SMR-20 (phr) | 100 | 0 |
| Specialized cis 1,4-polybutadiene rubber (phr) | 0 | 100 |
| Properties | | |
| RPA test | | |
| Uncured dynamic storage modulus G' (KPa) At 10% strain, 11 Hertz, 100° C.; | 211 | 219 |
| Dynamic storage modulus G' (MPa) | 1.60 | 1.70 |
| Tan delta | 0.138 | 0.181 |
| MDR test; 60 minutes at 150° C. | | |
| Maximum torque (dN-m) | 18.6 | 18.7 |
| Minimum torque (dN-m) | 2.9 | 3.3 |
| T90 (minutes) | 7.3 | 10.4 |
| Stress-strain | | |
| Tensile strength (MPa) | 22 | 15.1 |
| Elongation at break (%) | 522 | 533 |
| 300% modulus, ring, (MPa) | 12 | 7.7 |
| Rebound (Zwick) | | |
| 23° C. | 47 | 44 |
| 100° C. | 62 | 52 |
| Shore A Hardness | | |
| 23° C. | 66 | 66 |
| 100° C. | 60 | 61 |
| Tear Strength[1], N | | |
| At 23° C. | 147 | 261 |
| At 95° C. | 238 | 230 |
| Abrasion rate (mg/km), Grosch[2] | | |
| Low severity (20 N), 2° slip angle, disk speed = 40 km/hr, distance = 7,500 meters | 7.9 | 4.9 |
| Medium severity (40 N), 6° slip angle, disk Speed = 20 km/hr, distance = 1,000 meters | 67.3 | 35.7 |
| High severity (70 N), 12° slip angle, disk speed = 20 km/hr, distance = 250 meters | 770 | 185 |
| Ultra High severity (70 N), 16° slip angle, disk Speed = 20 km/hr, distance = 500 meters | 2,512 | 278 |

[1]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

[2]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters.

It can be seen from Table 2 that the abrasion rate of Experimental rubber Sample B with 100 phr of the specialized cis 1,4-polybutadiene rubber was dramatically lower for all severities of the abrasion test than the Control rubber Sample A with 100 phr of the natural rubber. This is considered herein to promote a dramatic beneficial improvement (reduction) in treadwear for a tire tread of such rubber composition where the natural rubber was replaced with the specialized cis 1,4-polybutadiene rubber.

It was an unexpected discovery that the tear strength of the Experimental rubber Sample B with 100 phr of the specialized cis 1,4-polybutadiene rubber was better than the tear strength of the Control rubber Sample A with 100 phr of natural rubber at 23° C. and similar at 95° C.

This is considered herein as being significant for demonstrating that use of the specialized cis 1,4-polybutdiene rubber to totally replace the natural rubber in the sense of achieving improved abrasion resistance without loss of tear strength which is considered herein to promote tire tread durability for a tire with tread of such rubber composition.

It was also surprisingly discovered that the uncured storage modulus (G') of 219 KPa for the uncured Experimental rubber Sample B composed of the specialized cis 1,4-polybutadiene rubber was similar to the storage modulus (G') of 211 KPa for the uncured Control rubber Sample A composed of natural rubber which indicates that the processability of the rubber Samples was similar.

EXAMPLE II

Rubber compositions were prepared to evaluate comparison between the specialized cis 1,4-polybutadiene rubber and designated cis 1,4-polybutadiene rubber (a highly abrasion resistant polybutadiene rubber).

Such rubber compositions are referred in this Example as rubber Samples C through G.

Rubber Sample C contained 100 phr of the specialized cis 1,4-polybutadiene rubber.

Rubber Sample G contained 100 phr of the alternative designated, high abrasion resistant, c is 1,4-polybutadiene rubber.

Rubber Samples D through F contained various intermediate amounts of the specialized and designated cis 1,4-polybutadiene rubbers.

The basic rubber composition formulation is shown in Table 3 and the ingredients are expressed in parts by weight per 100 parts rubber (phr) unless otherwise indicated.

The rubber compositions may be prepared in the manner of Example I.

TABLE 3

| | Parts |
|---|---|
| First Non-Productive Mixing Step (NP1) - Mixed to 160° C. (phr) | |
| Specialized cis 1,4-polybutadiene rubber[1] | 100 to 0 |
| Designated cis 1,4-polybutadiene rubber[2] | 0 to 100 |
| Carbon black, rubber reinforcing (N121)[3] | 35 |
| Silica, precipitated[4] | 32 |
| Silica coupling agent[5] | 2.6 |
| Wax, microcrystalline and paraffin | 1.5 |
| Fatty acid[6] | 2 |
| Antioxidants | 2.8 |
| Zinc oxide | 3 |
| Productive Mixing Step (PR) - Mixed to 110° C. | |
| Sulfur | 1.4 |
| Accelerator(s)[7] | 2 |

[1]Specialized 1,4-polybutadiene rubber (said nickel-amine based catalyzed 1,3-butadiene monomer) as Budene 1280 ™ from The Goodyear Tire & Rubber Company having a Tg of about −105° C. and a heterogeneity index in a range of from about 2.5/1 to about 3/1
[2]Designated (highly abrasion resistant) cis 1,4-polybutadiene rubber (said neodymium based catalyzed 1,3-butadiene monomer) as CB25 ™ from the Lanxess company having a Tg of about −107° C. and a heterogeneity index in a range of approximately 1.7/1 to about 1.8/1.

The remainder of the ingredients were those represented in Table 1 of Example I.

The following Table 4 represents the uncured and cure behavior and various physical properties of the rubber compositions based upon the basic formulation of Table 3, and reported as rubber Samples C through G.

TABLE 4

| | Samples | | | | |
|---|---|---|---|---|---|
| | C | D | E | F | G |
| Specialized cis 1,4-polybutadiene rubber (phr) | 100 | 75 | 50 | 25 | 0 |
| Designated cis 1,4-polybutadiene rubber (phr) | 0 | 25 | 50 | 75 | 100 |
| MDR test[1], 60 minutes at 150° C. | | | | | |
| Minimum torque (dN-m) | 3.3 | 3.6 | 3.7 | 4.2 | 4.3 |
| Maximum torque (dN-m) | 18.7 | 20.9 | 22.1 | 24.9 | 26.7 |
| T90 (minutes) | 10.4 | 10.4 | 9.8 | 9.4 | 9 |
| RPA test | | | | | |
| Uncured dynamic storage modulus G' (KPa) | 219 | 232 | 251 | 270 | 303 |
| At 10% strain, 11 Hertz, 40° C. | | | | | |
| Dynamic storage modulus (G'), (MPa) | 1.7 | 1.9 | 1.9 | 2.2 | 2.3 |
| Tan delta | 0.23 | 0.21 | 0.20 | 0.19 | 0.17 |
| At 10% strain, 11 Hertz, 100° C. | | | | | |
| Dynamic storage modulus G' (MPa) | 1.70 | 1.87 | 1.92 | 2.17 | 2.29 |
| Tan delta | 0.181 | 0.171 | 0.153 | 0.140 | 0.129 |
| Stress-Strain, ATS test[2], at 23° C. | | | | | |
| 300 percent ring modulus (MPa) | 7.7 | 8.6 | 9.0 | 9.7 | 10.4 |
| Tensile strength (MPa) | 15.1 | 17.2 | 15.7 | 17.6 | 17.8 |
| Elongation at break (%) | 533 | 546 | 486 | 498 | 479 |
| Shore A Hardness | | | | | |
| 23° C. | 66 | 67 | 68 | 69 | 70 |
| 100° C. | 61 | 62 | 63 | 65 | 66 |
| Tear Strength[3] (N) | | | | | |
| 23° C. | 261 | 233 | 211 | 194 | 187 |
| 95° C. | 230 | 224 | 176 | 160 | 139 |
| Rebound | | | | | |
| 23° C. | 44 | 46 | 50 | 52 | 55 |
| 100° C. | 52 | 55 | 59 | 60 | 63 |
| Processing Behavior | | | | | |
| Visual appearance | good | OK | poor | poor | poor |
| Abrasion rate (mg/km), Grosch | | | | | |
| Low Severity | 4.9 | 4.4 | 3.4 | 3.3 | 3.1 |
| Medium Severity | 35.7 | 27.3 | 24.4 | 24.4 | 23.6 |
| High Severity | 185 | 158 | 131 | 123 | 108 |
| Ultra High Severity | 278 | 219 | 202 | 178 | 167 |

The tests were those indicated for Table 2 of Example I except for the above inclusion of visual appearance of the rubber samples as an indication of processing behavior in a sense of observed milled rubber process behavior representative of an extruded uncured tread rubber strip which is to be built onto a green (uncured) tire in the building process for the tire.

It can be seen from Table 4 that that abrasion rates of the Experimental rubber Samples with increasing amounts of the designated (highly abrasion resistant) cis 1,4-polybutadiene rubber (CB25™ polybutadiene rubber) became increasingly lower for all severities of the abrasion test as compared to the Control rubber Sample A containing 100 phr of the specialized cis 1,4-polybutadiene rubber. This is considered herein to promote a beneficial improvement (reduction) in treadwear for a tire tread of such rubber composition where the specialized cis 1,4-polybutadiene rubber was replaced with increasing amounts of the designated cis 1,4-polybutadiene rubber.

However, an increasing loss in the tear strength is observed as the content increased of the designated cis 1,4-polybutadiene rubber in the rubber Samples as compared to Control rubber Sample C which contained 100 phr of the specialized cis 1,4-polybutadiene rubber at both 23° C. and 95° C.

This is considered as being significant for demonstrating that while use of the designated cis 1,4-polybutadiene rubber to totally replace the specialized cis 1,4-polybutadiene rubber was beneficial in the sense of achieving improved abrasion resistance, the significant loss of tear strength considered herein to promote a reduction in tire tread durability for a tire with tread of such rubber composition.

It is also observed that the storage modulus (G') of the uncured rubber compositions increased with an increase in content of the designated cis 1,4-polybutadiene rubber as compared to the Control rubber Sample C which contained 100 phr of the specialized cis 1,4-polybutadiene rubber which indicates that processability of the rubber Samples became more difficult as the designated cis 1,4-polybutadiene content increased—with a corresponding decrease in the specialized cis 1,4-polybutadiene rubber content.

It is therefore concluded that the benefits of replacing the specialized cis 1,4-polybutadiene rubber with the designated cis 1,4-polybutadiene rubber are significantly limited.

However, it might be considered that replacing up to 50 phr of the specialized cis 1,4-polybutadiene rubber with up to 50 phr of the designated cis 1,4-polybutadiene rubber might be beneficial if the trade-off of abrasion resistance rate, tear strength and processability of the uncured rubber composition would be acceptable for some tire tread rubber compositions.

As previously pointed out, it is envisioned that the enhanced processability of the specialized cis 1,4-polybutadiene rubber is a result of the presence of some branching configuration as interpreted by viewing its relatively broad heterogeneity index (Mw/Mn).

The presence of branching configuration of the cis 1,4-polybutadiene rubber can be observed via physical testing. Two techniques used for such interpretation are (1) Mooney Viscometer-Force Decay and (2) Cold Flow measurements.

For the Mooney Viscometer-Force Decay test, a disk is embedded in a rubber sample in a rigid cavity of a Mooney Viscometer at a specified pressure and temperature. A force is applied to the rubber sample which results in an angular twisting of the sample. After a fixed period of time, this force is released and the rubber sample permitted to relax. The time that it takes for the rubber sample to relax back to 80 percent of its final Mooney viscosity value is measured (in minutes) and reported as T80. As the degree of branching of a rubber increases, its T80 increases. This is considered as being due to a branched cis 1,4-polybutadiene rubber which relaxes at a slower rate than a linear cis 1,4-polybutadiene rubber.

For the Cold Flow determination, a sample of rubber is placed into a special apparatus and the apparatus is placed in an oven at a specified temperature. The amount of rubber extruded through an orifice in the apparatus over a defined time is collected and weighed. The resultant rubber flow through the orifice is reported in terms of milligrams per minute, or mg/min. A lower Cold Flow value is indicative of increased branching of the rubber.

Exemplary of T80 and Cold Flow values are shown in Table B for both of the specialized and the designated cis 1,4-polybutadiene elastomers.

TABLE B

| Elastomer | T80 (min) | Cold Flow (mg/min) |
|---|---|---|
| Specialized cis 1,4-polybutadiene rubber | 0.14 | 0.0 |
| Designated cis 1,4-polybutadiene rubber | 0.09 | 0.15 |
| indicates | Higher value indicates more branching | Lower value more branching |

EXAMPLE III

Rubber compositions were prepared to evaluate comparison between the designated (highly abrasion resistant) cis 1,4-polybutadiene rubber and natural cis 1,4-polyisoprene rubber.

Such rubber compositions are referred in this Example as rubber Samples H through L.

Rubber Sample H contained 100 phr of natural rubber.

Rubber Sample L contained 100 phr of the designated cis 1,4-polybutadiene rubber.

Rubber Samples I through K contained various intermediate amounts of the natural rubber and designated cis 1,4-polybutadiene rubber.

The basic rubber composition formulation is shown in Table 5 and the ingredients are expressed in parts by weight per 100 parts rubber (phr) unless otherwise indicated.

The rubber compositions may be prepared in the manner of Example I.

TABLE 5

| | Parts |
|---|---|
| First Non-Productive Mixing Step (NP1) - Mixed to 160° C. (phr) | |
| Designated cis 1,4-polybutadiene rubber[8] | 100 to 0 |
| Natural rubber[9] | 0 to 100 |
| Carbon black, rubber reinforcing (N121)[3] | 35 |
| Silica, precipitated[4] | 32 |
| Silica coupling agent[5] | 2.6 |
| Wax, microcrystalline and paraffin | 1.5 |
| Fatty acid[6] | 2 |
| Antioxidants | 2.8 |
| Zinc oxide | 3 |
| Productive Mixing Step (PR) - Mixed to 110° C. | |
| Sulfur | 1.4 |
| Accelerator(s)[7] | 2 |

[8]Designated cis 1,4-polybutadiene rubber (neodymium catalyzed 1,3-butadiene monomer) as C25 ™ from the Lanxess Company having a Tg of about −107° C. and a heterogeneity index in a range of approximately 1.7/1 to about 1.8/1.
[9]Natural cis 1,4-polyisoprene rubber as TSR20.

The ingredients were the same as Table 3 except for said designated cis 1,4-polybutadiene rubber and natural rubber.

The following Table 6 represents the uncured and cure behavior and various physical properties of the rubber compositions based upon the basic formulation of Table, and reported as rubber Samples H through L.

Control rubber Sample H which contained 100 phr of natural rubber at both 23° C. and particularly 95° C.

This is considered herein as being significant for demonstrating that while use of the designated cis 1,4-polybutdiene rubber to totally replace the natural rubber was beneficial in the sense of achieving improved abrasion resistance, the sig-

TABLE 6

|  | Samples | | | | |
| --- | --- | --- | --- | --- | --- |
|  | H | I | J | K | L |
| Natural rubber (phr) | 100 | 75 | 50 | 25 | 0 |
| Designated cis 1,4-polybutadiene rubber (phr) | 0 | 25 | 50 | 75 | 100 |
| MDR test[1], 60 minutes at 150° C. | | | | | |
| Minimum torque (dN-m) | 2.9 | 3.8 | 4.0 | 4.1 | 4.3 |
| Maximum torque (dN-m) | 18.6 | 20.3 | 21.9 | 24.1 | 26.7 |
| T90 (minutes) | 7.3 | 7 | 7.9 | 8.3 | 9 |
| RPA test | | | | | |
| Uncured dynamic storage modulus G' (KPa) | 211 | 254 | 281 | 284 | 303 |
| At 10% strain, 11 Hertz, 40° C. | | | | | |
| Dynamic storage modulus (G'), (MPa) | 1.6 | 1.8 | 1.9 | 2.1 | 2.3 |
| Tan delta | 0.193 | 0.173 | 0.171 | 0.174 | 0.166 |
| At 10% strain, 11 Hertz, 100° C. | | | | | |
| Dynamic storage modulus G' (MPa) | 1.60 | 1.77 | 1.92 | 2.13 | 2.33 |
| Tan delta | 0.138 | 0.135 | 0.133 | 0.135 | 0.129 |
| Stress-Strain ATS test[2], at 23° C. | | | | | |
| 300 percent ring modulus (MPa) | 12 | 10.7 | 10 | 9.9 | 10.4 |
| Tensile strength (MPa) | 22 | 21.3 | 20.7 | 18.7 | 17.8 |
| Elongation at break (%) | 522 | 538 | 550 | 515 | 479 |
| Shore A Hardness | | | | | |
| 23° C. | 66 | 66 | 67 | 70 | 70 |
| 100° C. | 60 | 61 | 62 | 65 | 66 |
| Tear Strength[3] (N) | | | | | |
| 23° C. | 147 | 142 | 126 | 139 | 187 |
| 95° C. | 238 | 173 | 142 | 139 | 139 |
| Rebound | | | | | |
| 23° C. | 47 | 50 | 52 | 52 | 55 |
| 100° C. | 62 | 64 | 63 | 62 | 63 |
| Processing Behavior | | | | | |
| Visual appearance | good | good | good | good | poor |
| Abrasion rate (mg/km), Grosch | | | | | |
| Low severity | 7.94 | 6.43 | 4.98 | 4.04 | 3.05 |
| Medium severity | 67.3 | 56.5 | 47.6 | 33 | 23.6 |
| High severity | 770 | 576 | 375 | 203 | 108 |
| Ultra High severity | 2512 | 1947 | 965 | 351 | 167 |

It can be seen from Table 6 that that abrasion rates of the Experimental rubber Samples with increasing amounts of the designated cis 1,4-polybutadiene rubber (CB25™ polybutadiene rubber) replacing the natural rubber became increasingly lower for all severities of the abrasion test as compared to the Control rubber Sample H containing 100 phr of the natural rubber. This is considered herein to promote a beneficial improvement (reduction) in treadwear for a tire tread of such rubber composition where the natural rubber was replaced with increasing amounts of the designated cis 1,4-polybutadiene rubber.

However, an increasing loss in the tear strength is observed as the content increased of the designated cis 1,4-polybutadiene rubber for most of the rubber Samples as compared to nificant loss of tear strength considered herein to promote a reduction in tire tread durability for a tire with tread of such rubber composition.

It is also observed that the storage modulus (G') of the uncured rubber compositions increased with an increase in content of the designated cis 1,4-polybutadiene rubber as compared to the Control rubber Sample H which contained 100 phr of the natural rubber which indicates that processability of the rubber Samples became more difficult as the designated cis 1,4-polybutadiene content increased—with a corresponding decrease in the natural rubber content.

It is therefore concluded that the benefits of replacing the natural rubber with the designated cis 1,4-polybutadiene rubber are significantly limited.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential rubber tread wherein said tread is a rubber composition exclusive of cis 1,4-polyisoprene rubber and comprised of, based on parts by weight per 100 parts by weight of the tread rubber (phr),
   (A) 100 phr of cis 1,4-polybutadiene rubber comprised of:
      (1) specialized cis 1,4-polybutadiene rubber, having a microstructure comprised of about 96 to about 99 percent cis 1,4-isomeric units, about 0.1 to about 1 percent trans 1,4-isomeric units and from about 1 to about 3 vinyl 1,2-isomeric units; a number average molecular weight (Mn) in a range of from about 90,000 to about 130,000 and a heterogeneity index (Mw/Mn) in a range of from about 2.5/1 to about 5/1, wherein said specialized cis 1,4-polybutadiene rubber is the product of polymerization of 1,3-butadiene monomer in an organic solvent in the presence of a catalyst composed of nickel octoate, triisobutylaluminum, hydrogen fluoride and parastyrenated diphenylamine, or
      (2) said specialized cis 1,4-polybutadiene rubber and up to 50 phr of designated cis 1,4-polybutadiene rubber having a microstructure comprised of about 96 to about 99 percent cis 1,4-isomeric units, a number average molecular weight (Mn) in a range of from about 150,000 to about 200,000 and a heterogeneity index (Mw/Mn) in a range of from about 1.5/1 to about 2/1,
      wherein said designated cis 1,4-polybutadiene rubber is the product of polymerization of 1,3-butadiene monomer in an organic solvent in the presence of a neodymium catalyst;
   (B) about 40 to about 110 phr of reinforcing filler wherein said reinforcing filler is a combination of rubber reinforcing carbon black and synthetic amorphous silica (precipitated silica) comprised of:
      (1) about 20 to about 60 phr of rubber reinforcing carbon black, and
      (2) about 10 to about 80 phr of precipitated silica;
   (C) coupling agent having a moiety reactive with hydroxyl groups on said precipitated silica and another different moiety interactive with carbon-to-carbon double bonds of said cis 1,4-polybutadiene rubber.

2. The tire of claim 1 wherein said cis 1,4-polybutadiene rubber is 100 phr of said specialized cis 1,4-polybutadiene rubber.

3. The tire of claim 1 wherein said cis 1,4-polybutadiene rubber is a combination of said specialized cis 1,4-polybutadiene rubber and up to about 50 phr of said designated cis 1,4-polybutadiene rubber.

4. The tire of claim 1 wherein, for said reinforcing filler, said rubber reinforcing carbon black has an Iodine adsorption value in a range of about 110 to about 145 g/kg and a dibutylphthalate (DBP) value in a range of about 110 to about 140 cc/100 g.

5. The tire of claim 1 wherein said reinforcing filler is comprised of a combination of precipitated silica and rubber reinforcing carbon black wherein the weight ratio of said precipitated silica to said rubber reinforcing carbon black is at least 1/1.

6. The tire of claim 1 wherein said coupling agent is comprised of bis(3-trialkoxysilylalkyl) polysulfide having an average of from 2 to 4 connecting sulfur atoms in its polysulfidic bridge or comprised of an alkoxyorganomercaptosilane.

7. The tire of claim 1 wherein said specialized cis 1,4-polybutadiene rubber has a degree of branching as indicated by its combination of number average molecular weight (Mn) in a range of from about 75,000 to about 150,000 combined with its broad heterogeneity index, namely a ratio of its number average molecular weight (Mn) to its weight average molecular weight (Mw), in a range of about 2.5/1 to about 5/1.

* * * * *